Patented May 18, 1926.

1,585,034

UNITED STATES PATENT OFFICE.

GEORGE A. HOWLAND, OF CHICAGO, ILLINOIS, ASSIGNOR TO JOHN H. THORNBURN, OF URBANA, ILLINOIS, AND EUGENE I. BURKE, OF CHAMPAIGN, ILLINOIS.

PLATE FOR SECONDARY BATTERIES.

No Drawing.   Application filed April 22, 1925.   Serial No. 25,130.

This invention relates to an improved plate construction for electrical batteries, and more particularly to batteries to be used in connection with radio work, internal combustion engine starting, and wherever a long life battery is required.

An object of the invention is to provide an improved plate construction which will preferably be used in a battery which utilizes a solid electrolyte.

A further object of the invention is to provide an improved plate for storage batteries and the like in which the grid comprises approximately 12% of antimonial lead, and which is adapted to receive a suitable paste made in accordance with my improved formula hereinafter described.

A still further object of the invention is to provide an improved plate construction which will insure long life in a battery and will be free from buckling and consequent short circuiting of the battery.

Other objects will appear as the description proceeds.

My improved plate is primarily intended to be employed in a battery using for an electrolyte a combination of ingredients set forth and claimed in an application filed by myself on even date herewith.

The grid of the plate is preferably formed of 12% antimonial lead, and is provided with suitable interstices into which my improved paste is adapted to be securely pressed.

The paste proper comprises approximately four ounces of red lead, three ounces of litharge, three-quarters of a pound of iron dust, one ounce of copper sulphate, one and one-half ounces of diluted ammonia, one-half pint of C.P. sulphuric acid having a specific gravity of 1075, and one pint of water. This paste is mixed as follows: The red lead and litharge are mixed together with the iron dust, after which the copper sulphate is placed in the mass and thoroughly admixed. The diluted ammonia and sulphuric acid are then admixed and placed in the mass and suitably stirred or mixed for fifteen minutes. The pint of water is then added to the admixture, and the whole is further mixed or stirred for five minutes.

The paste when thus mixed will be found to be in a viscous or paste-like state. The paste is then pressed into the grid casting and the whole dipped into a solution of ammonium chloride and allowed to dry for approximately eighteen hours, after which it is permitted to be formed for a period of forty-two hours at a charging rate of three amperes per plate, and then discharged at the rate of one ampere per plate for forty-two hours. During this operation one complete cycle is obtained, and it is desirous that four complete cycles should be had at the above rate.

As before mentioned, my improved plate construction is adapted to be more efficiently used with an electrolyte as set forth in my co-pending application filed under even date herewith. The electrolyte when placed in the battery will become hardened so that the usual and customary collecting of sediment in the bottom of the battery casing will be positively eliminated. Plates formed in accordance with my invention are so rigid and sturdily constructed that buckling will positively be prevented.

It is obvious that some equivalents might be substituted in the make-up of my plate, but it is to be understood that I do not intend to limit myself to the specific amounts of the chemicals and ingredients, neither do I limit myself to the specific ingredients themselves, as one ingredient might have the same property approximately as another ingredient and might be equally well used.

Having thus described my invention, what I claim as new and desire to secure by Letters Patent of the United States is:

1. A plate for secondary batteries comprising a casting of 12% antimonial lead, and a paste filling of 4 ounces of red lead, 3 ounces of litharge, ¾ of a pound of iron dust, 1 ounce of copper sulphate, 1½ ounces of diluted ammonia, ½ pint of C.P. sulphuric acid having a specific gravity of 1075, and 1 pint of water.

2. A method of forming a plate for secondary batteries comprising the use of a grid casting of 12% antimonial lead, filling the casting with a paste filler formed by admixing 4 ounces of red lead, 3 ounces of litharge, ¾ of a pound of iron dust, after which 1 ounce of copper sulphate is placed in the mass and thoroughly admixed, 1½ ounces of diluted ammonia and ½ pint of C.P. sulphuric acid having a specific gravity of 1075 is admixed and placed in the mass and suitably stirred for 15 minutes, and finally adding one pint of water to the admixture and stirring for an additional five minutes.

3. A plate for secondary batteries comprising a grid casting of 12% antimonial lead and a paste filling of red lead, litharge, iron dust and copper sulphate substantially as described.

4. A plate for secondary batteries comprising a grid casting of 12% antimonial lead and a paste filling of red lead, litharge, iron dust, copper sulphate, and diluted ammonia.

5. A plate for secondary batteries comprising a grid casting of 12% antimonial lead and a paste filling of red lead, litharge, iron dust, copper sulphate, diluted ammonia and C.P. sulphuric acid having a specific gravity of 1075.

In testimony whereof I affix my signature.

GEORGE A. HOWLAND.